(12) United States Patent
Deng et al.

(10) Patent No.: US 7,774,103 B2
(45) Date of Patent: Aug. 10, 2010

(54) ONLINE ESTIMATION OF VEHICLE SIDE-SLIP UNDER LINEAR OPERATING REGION

(75) Inventors: Weiwen Deng, Rochester Hills, MI (US); Haicen Zhang, Windsor (CA)

(73) Assignee: GM Global Technology Operations, Inc., Detroit, MI (US)

( * ) Notice: Subject to any disclaimer, the term of this patent is extended or adjusted under 35 U.S.C. 154(b) by 1104 days.

(21) Appl. No.: 11/192,423

(22) Filed: Jul. 28, 2005

(65) Prior Publication Data

US 2007/0027586 A1 Feb. 1, 2007

(51) Int. Cl.
G06F 7/02 (2006.01)
G06F 17/00 (2006.01)
B60W 30/00 (2006.01)

(52) U.S. Cl. ............... 701/1; 701/58; 701/69; 701/70; 701/82; 701/90; 701/91; 180/197; 303/139

(58) Field of Classification Search ......... 701/1, 701/22, 26–38, 41, 42, 45, 46, 48, 51, 53, 701/54, 58, 60, 65, 71, 72, 79, 82, 94, 110
See application file for complete search history.

(56) References Cited

U.S. PATENT DOCUMENTS

| | | | | |
|---|---|---|---|---|
| 5,475,593 A * | 12/1995 | Townend | ............ | 701/38 |
| 5,732,377 A | 3/1998 | Eckert | | |
| 5,826,209 A * | 10/1998 | Matsuno | ............ | 701/69 |
| 5,925,083 A * | 7/1999 | Ackermann | ............ | 701/41 |
| 6,053,583 A * | 4/2000 | Izumi et al. | ............ | 303/150 |
| 6,079,513 A * | 6/2000 | Nishizaki et al. | ............ | 180/402 |
| 6,128,569 A | 10/2000 | Fukushima | | |
| 6,155,655 A * | 12/2000 | Matsuno | ............ | 303/140 |
| 6,163,747 A * | 12/2000 | Matsuno | ............ | 701/80 |
| 6,308,115 B1 * | 10/2001 | Yamaguchi et al. | ............ | 701/1 |
| 6,317,677 B1 * | 11/2001 | Monzaki et al. | ............ | 701/84 |
| 6,360,150 B1 * | 3/2002 | Fukushima et al. | ............ | 701/41 |
| 6,374,172 B1 * | 4/2002 | Yamaguchi et al. | ............ | 701/90 |
| 6,549,842 B1 * | 4/2003 | Hac et al. | ............ | 701/80 |
| 6,587,775 B2 * | 7/2003 | Nishida et al. | ............ | 701/89 |

(Continued)

OTHER PUBLICATIONS

Cherouat, H., "Vehicle Velocity, Side Slip Angles and Yaw Rate Estimation", IEEE ISIE 2005, Jun. 20-23, Dubrovnik, Croatia, pp. 349-354.

(Continued)

*Primary Examiner*—Jack Keith
*Assistant Examiner*—Jonathan M Dager
(74) *Attorney, Agent, or Firm*—John A. Miller; Miller IP Group, PLC

(57) ABSTRACT

A system for estimating vehicle side-slip in the linear vehicle operating region that includes updating front and rear cornering stiffness signals. The system includes a first state observer processor that employs a bicycle model with state feedback for generating yaw acceleration and lateral acceleration signals. The system further includes a subtractor that receives the yaw acceleration and lateral acceleration signals and measured yaw rate and lateral acceleration signals, and generates yaw acceleration and lateral acceleration error signals. A parameter estimation processor calculates an updated front cornering stiffness and rear cornering stiffness signals. The updated front and rear cornering stiffness signals are sent back to the first state observer processor, and are used by second state observer processor for generating the estimated vehicle side-slip.

15 Claims, 2 Drawing Sheets

U.S. PATENT DOCUMENTS

| | | | | |
|---|---|---|---|---|
| 6,702,717 | B2* | 3/2004 | Murakami | 477/182 |
| 6,853,886 | B2* | 2/2005 | Mori | 701/1 |
| 7,035,726 | B2* | 4/2006 | Sakata | 701/72 |
| 7,066,560 | B2* | 6/2006 | Kato et al. | 303/140 |
| 7,162,333 | B2* | 1/2007 | Koibuchi et al. | 701/1 |
| 2002/0002433 | A1* | 1/2002 | Matsuno | 701/67 |
| 2002/0007239 | A1* | 1/2002 | Matsumoto et al. | 701/41 |
| 2002/0013646 | A1* | 1/2002 | Nishizaki et al. | 701/41 |
| 2002/0087247 | A1* | 7/2002 | Tanaka et al. | 701/70 |
| 2003/0060959 | A1* | 3/2003 | Lin et al. | 701/70 |
| 2003/0088350 | A1* | 5/2003 | Lin et al. | 701/41 |
| 2003/0093207 | A1* | 5/2003 | Pallot | 701/70 |
| 2003/0125864 | A1* | 7/2003 | Banno et al. | 701/84 |
| 2003/0130775 | A1* | 7/2003 | Lu et al. | 701/36 |
| 2003/0195689 | A1* | 10/2003 | Mori | 701/70 |
| 2004/0102886 | A1* | 5/2004 | Lin et al. | 701/70 |
| 2005/0075771 | A1* | 4/2005 | Matsuno | 701/36 |
| 2005/0154513 | A1* | 7/2005 | Matsunaga et al. | 701/38 |
| 2005/0189163 | A1* | 9/2005 | Barton et al. | 180/446 |
| 2005/0225477 | A1* | 10/2005 | Cong et al. | 342/70 |
| 2006/0058935 | A1* | 3/2006 | Ghoneim et al. | 701/41 |
| 2006/0235589 | A1* | 10/2006 | Deng et al. | 701/41 |

OTHER PUBLICATIONS

Ro, Paul I. "Improvement of High Speed 4-WS Vehicle Handling Performance by Sliding Mode Control", Proceedings of the American Control Conference, Baltimore, Maryland, Jun. 1994, pp. 1974-1978.

Gaspar, Peter, "Prediction Based Combined Control to Prevent the Rollover of heavy Vehicles", Proceedings of the 13th Mediterranean Conference on Control and Automation, Limassol, Cyprus, Jun. 27-29, 2005, pp. 575-580.

Cherouat, H. "An Observer and an Integrated Braking/Traction and Steering Control for a Cornering Vehicle", 2005 American Control Conference, Jun. 8-10, 2005, Portland, OR, USA, pp. 2212-2217.

* cited by examiner

ONLINE ESTIMATION OF VEHICLE SIDE-SLIP UNDER LINEAR OPERATING REGION

BACKGROUND OF THE INVENTION

1. Field of the Invention

This invention relates generally to a method for estimating vehicle side-slip and, more particularly, to a method for estimating vehicle side-slip within a linear vehicle operating region, where the method includes updating front and rear cornering stiffness signals using a linear bicycle model with state feedback.

2. Discussion of the Related Art

Various vehicle control systems are known in the art, such as lane-keeping systems, lane-changing systems and path-following systems, that improve driver convenience, safety and comfort. These control systems typically operate within a linear vehicle operating region, where the vehicle states define the behavior of the vehicle. Vehicle side-slip is one of the key states for determining vehicle dynamics, kinematics and control for these types of control systems. Vehicle side-slip is defined as the lateral speed at the vehicle's center of gravity in a direction perpendicular to the vehicle longitudinal velocity. The vehicle side-slip combined with the vehicle longitudinal velocity forms a vehicle vector velocity in the vehicle traveling direction. Vehicle control systems calculate the vehicle side-slip to determine an error so that the vehicle can be controlled to reduce the side-slip to zero. However, vehicle side-slip is difficult to accurately calculate because vehicle side-slip is typically very small within the linear operating region of the vehicle. Also, measuring the vehicle lateral speed to determine the side-slip is currently cost prohibitive, and thus impractical.

Three approaches are known in the art for determining vehicle side-slip. These approaches are sometimes defined as an indirect sensor approach, a direct sensor approach and a model-based approach. The indirect sensor approach estimates vehicle side-slip by the integration of the side-slip rate from existing sensors, such as yaw rate sensors and lateral acceleration sensors. However, this approach typically has the disadvantages of sensor noise, drift and cumulative integration error.

The direct sensor approach measures the vehicle side-slip directly, such as by a GPS or camera based system. However, this approach typically has a slow throughput, and is often subject to weather and/or road conditions, and thus may not be suitable for fast-loop control purposes and be reliable for all times.

The model based approach is valid only in the vehicle linear operating region, but has the advantages of being more reliable and cost effective. The model based side-slip estimation results are more smooth and continuous, and the requirements of the sensors are less restrictive. However, the model based approach is often limited by model inaccuracy, unknown road surfaces and other unknown disturbances.

SUMMARY OF THE INVENTION

In accordance with the teachings of the present invention, a system for estimating vehicle side-slip in the linear vehicle operating region is disclosed that includes updating front and rear cornering stiffness parameters. The system includes a first state observer processor that employs a bicycle model for generating yaw acceleration and lateral acceleration signals. The first state observer processor receives sensor signals from a vehicle speed sensor and a hand-wheel angle sensor. The system calculates yaw acceleration and lateral acceleration and compares them to measured yaw rate and lateral acceleration signals to generate yaw acceleration and lateral acceleration error signals. The error signals are sent to a parameter estimation processor that calculates an updated front cornering stiffness and rear cornering stiffness. The updated front and rear cornering stiffness are sent back to the first state observer processor, and are used by a second state observer processor for generating the estimated vehicle side-slip. The system includes a logic and data sanity check processor to ensure that the updated front and rear cornering stiffness are meaningful and meet predetermined criteria before the second state observer processor uses them.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for estimating vehicle side-slip in a linear operating region of the vehicle is merely exemplary in nature, and is in no way intended to limit the invention or its applications or uses.

The following discussion of the invention includes a technique for estimating vehicle side-slip in the linear vehicle operating region using a bicycle model with state feedback to provide updated front and rear cornering stiffness. The side-slip estimation process uses sensor signals from a vehicle speed sensor, a yaw rate sensor, a lateral acceleration sensor and a hand-wheel angle sensor. The side-slip estimation process of the invention provides a number of advantages, including, but not limited to, making a fast-changing state estimation become a slow-changing parameter estimation to increase reliability and robustness; increased accuracy by taking into consideration the lumped effect of vehicle non-linearities, such as un-modeled dynamics and unknown road surfaces; monitoring the estimation results; and providing less strict requirements for sensor signal noise and bias.

The present invention uses a bicycle mode to calculate the vehicle side-slip. For the bicycle model and calculations discussed below, the following nomenclature is used.

$m_1$: mass of the vehicle;
$I_z$: yaw moment of inertia around the center of gravity of the vehicle;
a: distance from the center of gravity to the front axle of the vehicle;
b: distance from the center of gravity to the rear axle of the vehicle;
c: steering system compliance coefficient;
$C_f$: concerning stiffness of the front wheels of the vehicle;
$C_r$: concerning stiffness of the rear wheels of the vehicle;
$v_x$: forward speed of the vehicle;
$v_y$: lateral speed of the vehicle;
r: yaw rate of the vehicle;

$\delta_f$: steering angle of the front wheels of the vehicle;
$\delta_r$: steering angle of the rear wheels of the vehicle;
$\delta_{CS}$: steering angle coefficient;
$A_y$: lateral acceleration of the vehicle;
$c_1$: suspension steer compliance coefficient due to $F_y$;
$c_2$: suspension steer compliance coefficient due to Mz;
d: half-length of tire contract patch;
$F_y$: vehicle tire lateral force;
Mz: vehicle tire alignment torque; and
x: system state variables.

Figure 1:
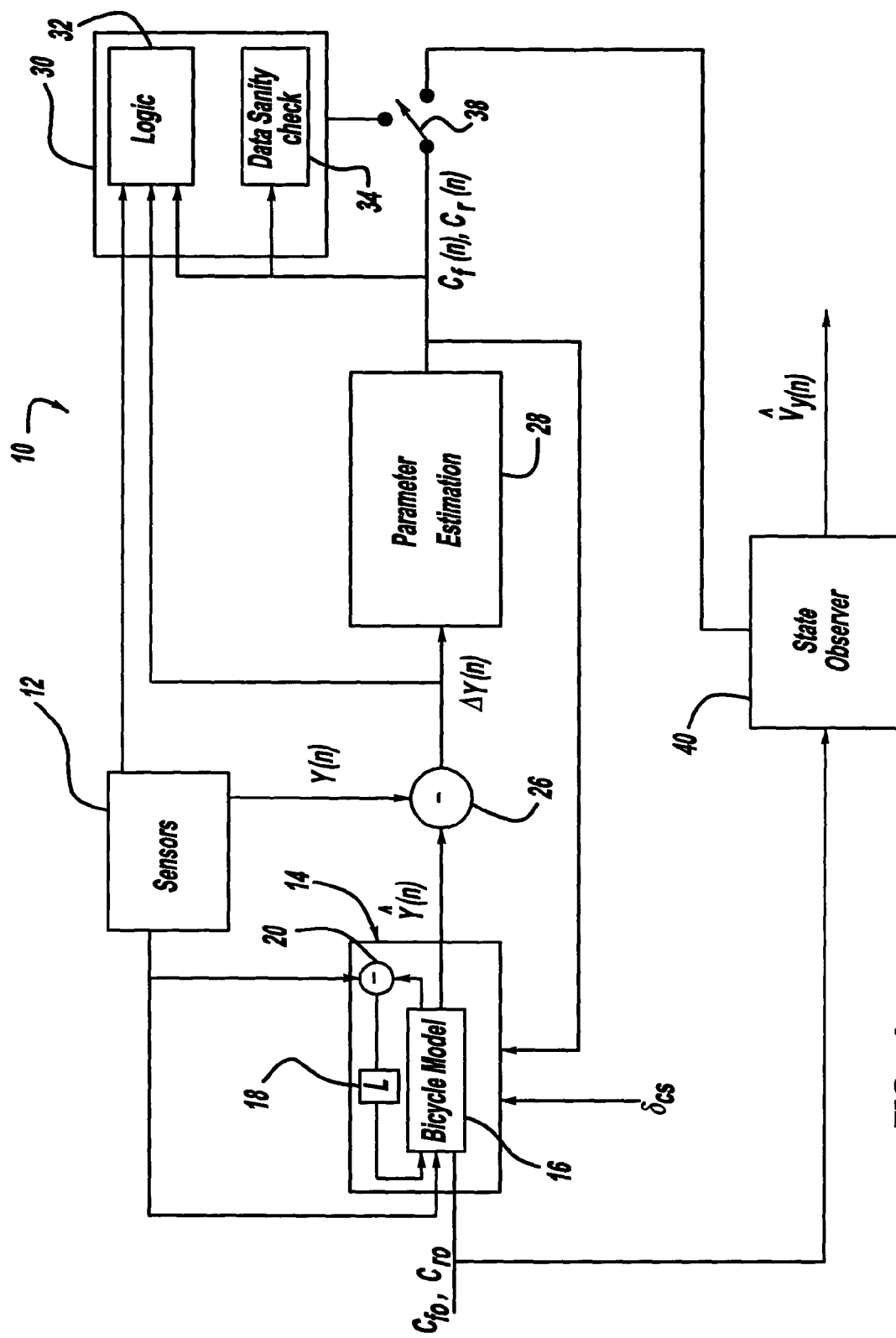
FIG. 1 is a block diagram of a system for estimating vehicle side-slip, according to an embodiment of the present invention.

FIG. 1 is a block diagram of a system 10 that estimates vehicle side-slip $v_y$ that will then be used in vehicle control systems, such as those mentioned above, according to an embodiment of the present invention. The system 10 uses sensor signals from sensors 12 to provide the side-slip estimation. The sensors 12 are intended to represent a vehicle speed sensor, a vehicle yaw rate sensor, a vehicle lateral acceleration sensor and a vehicle hand-wheel angle sensor, which are all part of the vehicle control systems discussed above.

The system 10 includes a state observer processor 14 that receives an initial front cornering stiffness $C_{fo}$ and an initial rear cornering stiffness $C_{ro}$ predetermined for the particular vehicle. The state observer processor 14 includes a bicycle model processor 16, a feedback gain processor 18 and a subtractor 20. The bicycle model processor 16 receives the hand-wheel angle signal $\epsilon_f$ and the vehicle speed signal $v_x$ from the sensors 12. The bicycle model processor 16 calculates vehicle states including vehicle yaw rate and lateral speed, and estimated variables, including vehicle yaw acceleration and vehicle lateral acceleration. The vehicle yaw rate from the bicycle model processor 16 and the yaw rate signal r from the sensors 12 are applied to the subtractor 20 that generates an error signal that is applied to the feedback gain processor 18. The feedback gain processor 18 applies a gain L to the error signal that is sent to the bicycle model processor 16 to form a state. The output of the state observer processor 14 includes the yaw acceleration and the lateral acceleration signals $\hat{Y}$ that is estimated from the yaw rate and lateral and longitudinal speeds by the bicycle model processor 16. The front cornering stiffness $C_f$ and the rear cornering stiffness $C_r$ are updated, as will be described below, and are used by the state observer processor 14 to generate both yaw acceleration and lateral acceleration signals $\hat{Y}$.

The state observer processor 14 defines the vehicle state variables of yaw rate and lateral speed from the vehicle lateral dynamics as:

$$\begin{bmatrix} \dot{v}_y \\ \dot{r} \end{bmatrix} = \begin{bmatrix} a_{11} & a_{12} \\ a_{21} & a_{22} \end{bmatrix} \begin{bmatrix} v_y \\ r \end{bmatrix} + \begin{bmatrix} b_{11} & b_{12} \\ b_{21} & b_{22} \end{bmatrix} \begin{bmatrix} \delta_f \\ \delta_r \end{bmatrix} \quad (1)$$

Where, $$a_{11} = -\frac{C_f + C_r}{mv_x} \quad (2)$$

$$a_{12} = -\left(\frac{aC_f - bC_r}{mv_x} + v_x\right) \quad (3)$$

$$a_{21} = -\frac{aC_f - bC_r}{I_z v_x} \quad (4)$$

$$a_{22} = -\frac{a^2 C_f - b^2 C_r}{I_z v_x} \quad (5)$$

$$b_{11} = \frac{C_f}{m} \quad (6)$$

-continued $$b_{12} = \frac{C_r}{m} \quad (7)$$

$$b_{21} = \frac{aC_f}{I_z} \quad (8)$$

$$b_{22} = \frac{bC_r}{I_z} \quad (9)$$

The matrix form of the state observer is:

$$\dot{\hat{x}} = A\hat{x} + Bu + L(y - \hat{y}) \quad (10)$$

$$y = C\hat{x} \quad (11)$$

Where y is the output of the state observer. Thus:

$$\dot{x} - \dot{\hat{x}} = (A - LC)(x - \hat{x}) \quad (12)$$

The bicycle model is very sensitive to steering angles. The steering caused by suspension and steering system compliance generates a large error for the estimation of the front cornering stiffness $C_f$ and the rear cornering stiffness $C_r$. Therefore a compensation needs to be made. A compliance steering compensation signal $\delta_{CS}$ is applied to the bicycle model processor 16 for this purpose, which is calculated as:

$$\delta_{cs} = c_1 F_y + c_2 M_z = \left(c_1 + \frac{1}{3}ac_2\right) F_y \quad (13)$$

The system 10 includes a subtractor 26 that receives the yaw acceleration and lateral acceleration signals $\hat{Y}$ from the state observer processor 14 and the actual measurement from the sensors 12 of the yaw acceleration (derived from the yaw rate) and the lateral acceleration signals Y. The subtractor 26 generates an error signal $\Delta Y$ of the difference between the yaw acceleration and lateral acceleration signals.

The error signal $\Delta Y$ is applied to a parameter estimation processor 28 that generates an updated front cornering stiffness $C_f$ and rear cornering stiffness $C_r$ that are applied to the state observer processor 14. In one embodiment, the parameter estimation processor 28 uses a recursive least squares (RLS) parameter estimation, well known to those skilled in the art. The updated front cornering stiffness $C_f$ and rear cornering stiffness $C_r$ are used by the state observer processor 14 to drive the error signal $\Delta Y$ as close as possible to zero.

In one embodiment, the parameter estimation processor 28 calculates the lateral acceleration signal $A_y$ and the yaw acceleration signal $\dot{r}$ as:

$$A_y = \dot{v}_y + r v_x \quad (14)$$

$$= a_{11} v_y + a_{12} r + b_{11} \delta_f + b_{12} \delta_r + r v_x$$

$$= \left(-\frac{v_y}{mv_x} - \frac{ar}{mv_x} + \frac{\delta_f}{m}\right) C_f + \left(-\frac{v_y}{mv_x} - \frac{br}{mv_x} + \frac{\delta_r}{m}\right) C_r$$

$$\dot{r} = a_{21} v_y + a_{22} r + b_{21} \delta_f + b_{22} \delta_r \quad (15)$$

$$= \left(-\frac{av_y}{I_z v_x} - \frac{a^2 r}{I_z v_x} + \frac{a\delta_f}{I_z}\right) C_f + \left(-\frac{bv_y}{I_z v_x} - \frac{b^2 r}{I_z v_x} + \frac{b\delta_r}{I_z}\right) C_r$$

The combination of the lateral acceleration and the yaw acceleration signals Y is defined herein as:

$$Y = \phi^T \theta \qquad (16)$$

Where, $$Y = \begin{bmatrix} A_y \\ \dot{r} \end{bmatrix} \qquad (17)$$

$$\theta^T = \begin{bmatrix} -\dfrac{v_y}{mv_x} - \dfrac{ar}{mv_x} + \dfrac{\delta_f}{m} & -\dfrac{v_y}{mv_x} - \dfrac{br}{mv_x} + \dfrac{\delta_r}{m} \\ -\dfrac{av_y}{I_z v_x} - \dfrac{a^2 r}{I_z v_x} + \dfrac{a\delta_f}{I_z} & -\dfrac{bv_y}{I_z v_x} - \dfrac{b^2 r}{I_z v_x} + \dfrac{b\delta_r}{I_z} \end{bmatrix} \qquad (18)$$

$$\theta = \begin{bmatrix} C_f \\ C_r \end{bmatrix} \qquad (19)$$

The recursive least squares estimation method with a forgetting factor can be used for parameter estimation using the equations:

$$\hat{\theta}(t) = \hat{\theta}(t-1) + K(t)(Y(t) - \phi^T(t)\hat{\theta}(t-1)) \qquad (20)$$

$$K(t) = P(t)\phi(t) = P(t-1)\phi(t)(\lambda I + \phi^T(t)P(t-1)\phi(t))^{-1} \qquad (21)$$

$$P(t) = (I - K(t)\phi^T(t))P(t-1)/\lambda \qquad (22)$$

Initial parameters for the RLS parameter estimation play an important role in the estimation process. For example, the initial values for the cornering stiffnesses $C_{fo}$, $C_{ro}$ can be chosen as $C_{fo} = 929.10$ and $C_{ro} = 1517.08$, which can be obtained from a specific vehicle model. The initial value of the covariance matrix can be set at $P = 100000\ I(2)$, where $I(2)$ is a 2×2 identity matrix. The value of the forgetting factor can be $\lambda = 0.4$ and the sampling rate can be $T_s = 0.01$ seconds.

The system 10 also includes a logic and data sanity check processor 30 that determines whether the updated front cornering stiffness $C_f$ and rear cornering stiffness $C_r$ are within a predefined range before these signals are used to determine the vehicle side-slip. The logic and data sanity check processor 30 includes a logic processor 32 that receives the sensor signals from the sensors 12, the error signal $\Delta Y$ from the subtractor 26 and the updated front cornering stiffness $C_f$ and rear cornering stiffness $C_r$. The logic processor 32 determines if the system 10 is operating under predefined regions for parameter estimation, if the estimated parameters are converging, if the error dynamics is in a steady state region, and if the errors are minimized.

The processor 30 includes a data sanity check processor 34 that receives the updated front cornering stiffness $C_f$ and rear cornering stiffness $C_r$, and determines if the estimated cornering stiffness signals are meaningful and can be used.

A switch 38 switches the updated front cornering stiffness $C_f$ and rear cornering stiffness $C_r$ between the logic and data sanity check processor 30 and a second state observer processor 40. Once the logic and data sanity check processor 30 determines that the updated front cornering stiffness $C_f$ and rear cornering stiffness $C_r$ are suitable, then the switch 38 is switched so that the signals are applied to the state observer processor 40. The state observer processor 40 uses the updated front and the rear cornering stiffness and the state observer discussed above to provide an estimated vehicle side-slip signal $\hat{v}_y$.

The process of determining the updated front cornering stiffness $C_f$ and rear cornering stiffness $C_r$ by the state observer processor 14 and the parameter estimation processor 28 is a slow loop, and provides the updated signals on the order of about one to two seconds. However, the state observer processor 40 provides the estimated vehicle side-slip signal $\hat{v}_y$ in real time on a fast loop basis, on the order of a few milliseconds.

Figure 2:
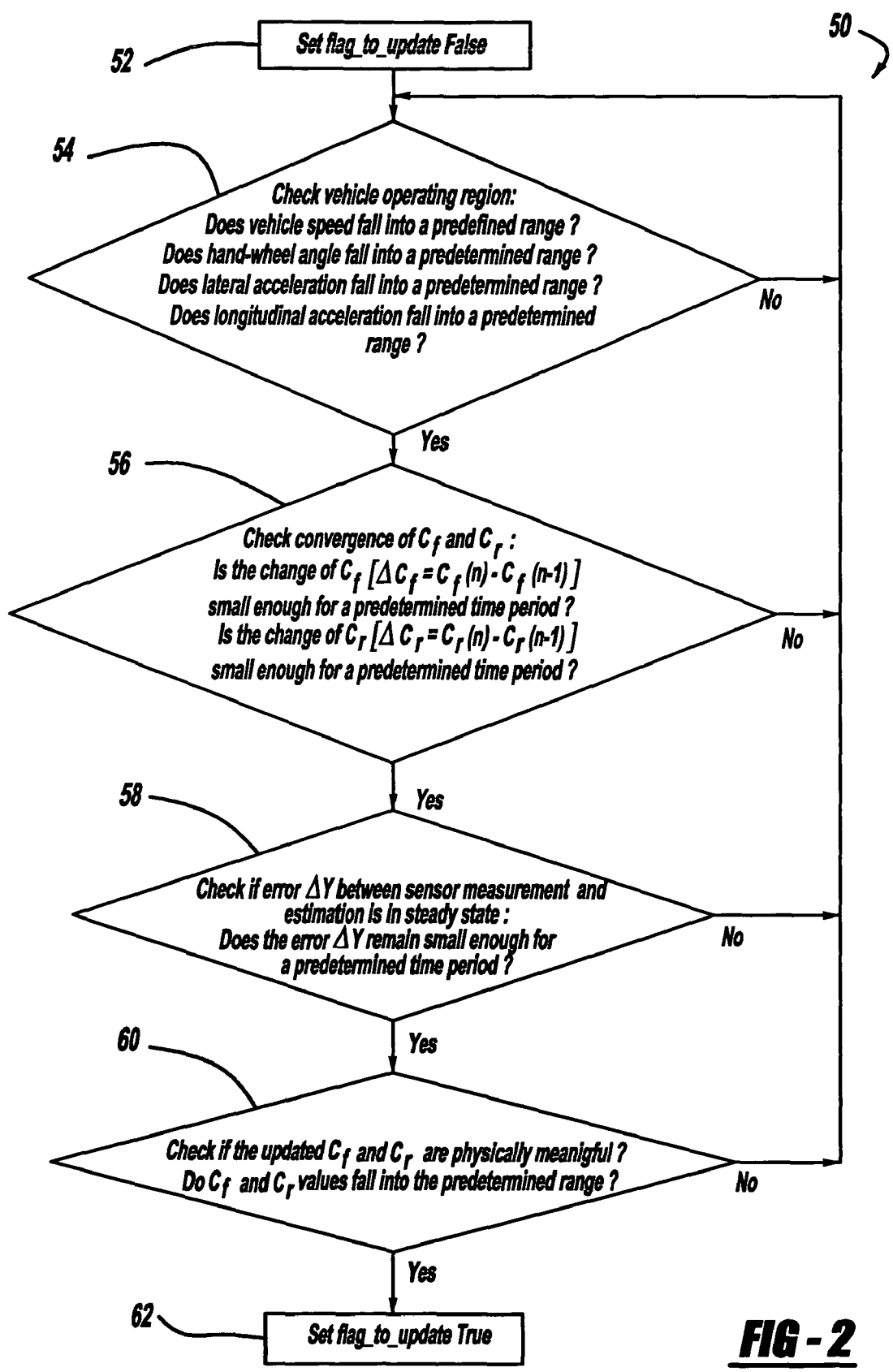
FIG. 2 is a flow chart diagram showing a method for determining whether updated front and rear cornering stiffness signals meet predetermined criteria, according to an embodiment of the present invention.

FIG. 2 is a flow chart diagram 50 showing a process for determining when the logic and data sanity check processor 30 will allow the front and rear cornering stiffness to be updated. The algorithm sets a cornering stiffness update flag to false at box 52 meaning that the updated front cornering stiffness $C_f$ and rear cornering stiffness $C_r$ from the parameter estimation processor 28 are not ready to be used by the state observer process block 40. The algorithm then determines if the vehicle is in the linear operating range at decision diamond 54. Particularly, the algorithm determines if the vehicle speed is within a predetermined range, if the hand-wheel angle is within a predetermined range, if the vehicle lateral acceleration is in a predetermined range, and if the longitudinal acceleration is in a predetermined range. If the vehicle operating condition meets all of these requirements, then the algorithm checks the convergence of the front cornering stiffness $C_f$ and the rear cornering stiffness $C_r$ at decision diamond 56. Particularly, the algorithm determines if the change in the front cornering stiffness $C_f$ and the rear cornering stiffness $C_r$ are small enough for a predetermined time period.

If the cornering stiffness signals are small enough, then the algorithm determines if the error signal between the sensor measurements and the estimation is in a steady state region at decision diamond 58. Particularly, the algorithm determines if the error signal remains small enough for a predetermined time period. If the error signal does remain small enough, then the algorithm checks if the updated front cornering stiffness $C_f$ and rear cornering stiffness $C_r$ have a physical meaning, i.e., fall within a predefined range, at decision diamond 60. If the updated front and rear cornering stiffness signals meet these requirements, then the algorithm sets the update flag to true at box 62 so that the updated front cornering stiffness $C_f$ and the rear cornering stiffness $C_r$ are used by the state observer processor 40 to generate the estimated vehicle side-slip signal $\hat{v}_y$.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for estimating vehicle side-slip of a vehicle, said system comprising:
   a vehicle speed sensor for providing a vehicle speed signal of the speed of the vehicle;
   a vehicle yaw rate sensor for providing a yaw rate signal of the yaw rate of the vehicle;
   a vehicle lateral acceleration sensor for providing a vehicle lateral acceleration of the vehicle;
   a hand-wheel angle sensor for providing a hand-wheel angle signal;
   a first state observer processor responsive to the vehicle speed signal and the hand-wheel angle signal, said first state observer processor configured to generate estimated yaw acceleration and estimated lateral acceleration signals;
   a subtractor responsive to the estimated yaw acceleration and estimated lateral acceleration signals, said subtractor configured to generate yaw acceleration and lateral acceleration error signals;
   a parameter estimation processor responsive to the yaw acceleration and lateral acceleration error signals, said parameter estimation processor configured to generate an updated front cornering stiffness signal and rear cornering stiffness signal, said first state observer processor being responsive to the updated front and rear cornering stiffness signals; and a second state observer processor responsive to the updated front cornering stiffness signal and the rear cornering stiffness signal, said second state observer processor configured to calculate an estimated vehicle side-slip signal.

2. The system according to claim 1 wherein the first state observer processor and the second state observer processor use a bicycle model and state feedback to generate the estimated yaw acceleration and estimated lateral acceleration signals and the estimated vehicle side-slip signal.

3. The system according to claim 1 wherein the first state observer processor is further responsive to a vehicle steering angle compliance signal for generating the estimated yaw acceleration and estimated lateral acceleration signals.

4. The system according to claim 1 wherein the parameter estimation processor uses a recursive least squares estimation process for determining the updated front cornering stiffness signal and the rear cornering stiffness signal.

5. The system according to claim 1 further comprising a logic and data sanity check processor responsive to the yaw rate signal, the lateral acceleration signal, the vehicle speed signal, the updated front and rear cornering stiffness signals, and the yaw acceleration and lateral acceleration error signals, said logic and data sanity check processor determining whether the updated front cornering stiffness signal and the rear cornering stiffness signal meet predetermined criteria before they are sent to the second state observer processor.

6. The system according to claim 5 wherein the logic and data sanity check processor determines whether the updated front cornering stiffness signal and the rear cornering stiffness signal are converging, if the error signals are in a steady state region, if the system is operating under predefined regions for parameter estimation and if the error signals are minimized.

7. The system according to claim 1 wherein the first state observer processor and the parameter estimation processor are on a relatively slow loop and the second state observer processor is on a relatively fast loop.

8. A system for estimating vehicle side-slip of a vehicle, said system comprising:

a first state observer processor responsive to vehicle state signals, said first state observer processor configured to use the state signals to generate yaw acceleration and lateral acceleration signals;

a subtractor responsive to the yaw acceleration and lateral acceleration signals and the vehicle state signals, said subtractor configured to generate yaw acceleration and lateral acceleration error signals; and a parameter estimation processor responsive to the yaw acceleration and lateral acceleration error signals, said parameter estimation processor configured to generate updated front cornering stiffness and rear cornering stiffness signals.

9. The system according to claim 8 wherein the state signals include one or more of a vehicle speed signal of the speed of the vehicle, a yaw rate signal of the yaw rate of the vehicle, a vehicle lateral acceleration of the vehicle, and a hand-wheel angle signal.

10. The system according to claim 8 further comprising a second state observer processor responsive to the updated front cornering stiffness signal and the rear cornering stiffness signal, said second state observer processor calculating the estimated vehicle side-slip signal.

11. The system according to claim 8 wherein the first state observer processor uses a bicycle model and state feedback to generate the yaw acceleration and lateral acceleration signals.

12. The system according to claim 8 wherein the first state observer processor is further responsive to a vehicle steering angle compliance signal for generating the yaw acceleration and lateral acceleration signals.

13. The system according to claim 8 wherein the parameter estimation processor uses a recursive least squares estimation process for determining the updated front cornering stiffness signal and the rear cornering stiffness signal.

14. The system according to claim 8 further comprising a logic and data sanity check processor responsive to the vehicle state signals, the updated front and rear cornering stiffness signals, and the yaw acceleration and lateral acceleration error signals, said logic and data sanity check processor determining whether the updated front cornering stiffness signal and the rear cornering stiffness signal meet predetermined criteria before they are sent to the second state observer processor.

15. The system according to claim 14 wherein the logic and data sanity check processor determines whether the updated front cornering stiffness signal and the rear cornering stiffness signal are converging, if the error signals are in a steady state region, if the system is operating under predefined regions for parameter estimation and if the error signals are minimized.

* * * * *